(12) United States Patent
Clark

(10) Patent No.: US 6,636,578 B1
(45) Date of Patent: Oct. 21, 2003

(54) FUEL ASSEMBLY STRUCTURAL REINFORCEMENT AND METHOD

(75) Inventor: Darel Ray Clark, Lynchburg, VA (US)

(73) Assignee: Framatome ANP Inc., Lynchburg, VA (US)

( * ) Notice: Subject to any disclaimer, the term of this patent is extended or adjusted under 35 U.S.C. 154(b) by 0 days.

(21) Appl. No.: 10/162,945

(22) Filed: Jun. 5, 2002

(51) Int. Cl.[7] ............................................. G21C 19/26
(52) U.S. Cl. ....................................... 376/261; 376/264
(58) Field of Search ................................. 376/261, 262, 376/268, 446, 264; 414/147; 29/723

(56) References Cited

U.S. PATENT DOCUMENTS

| | | | | |
|---|---|---|---|---|
| 4,006,930 A | * | 2/1977 | Cawley et al. ............... 294/98.1 |
| 4,244,616 A | * | 1/1981 | Buchalet ........................ 294/95 |
| 4,323,428 A | * | 4/1982 | Schallenberger et al. ... 376/353 |
| 4,558,504 A | * | 12/1985 | Le Pargneux et al. ......... 29/452 |
| 4,663,119 A | * | 5/1987 | Kerrey ........................... 376/446 |
| 4,664,874 A | * | 5/1987 | Shallenberger et al. ...... 376/261 |
| 4,683,117 A | * | 7/1987 | Carlson et al. ................ 376/449 |
| 4,688,416 A | * | 8/1987 | Shallenberger et al. ... 72/370.13 |
| 4,699,758 A | * | 10/1987 | Shallenberger et al. ...... 376/446 |
| 4,774,752 A | * | 10/1988 | Cooper, Jr. et al. ......... 29/426.4 |
| 4,814,138 A | * | 3/1989 | Fick et al. ..................... 376/463 |
| 4,919,881 A | * | 4/1990 | Hankinson et al. ........... 376/260 |
| 5,265,138 A | * | 11/1993 | DeMario et al. .............. 376/434 |
| 5,280,508 A | * | 1/1994 | Okashima et al. ............ 376/261 |
| 5,483,560 A | * | 1/1996 | Potz et al. ..................... 376/250 |
| 5,625,657 A | * | 4/1997 | Gallacher ...................... 376/261 |
| 5,671,261 A | * | 9/1997 | Frederickson ................. 376/446 |

\* cited by examiner

*Primary Examiner*—Michael J. Carone
*Assistant Examiner*—Daniel Matz
(74) *Attorney, Agent, or Firm*—Kenyon & Kenyon

(57) ABSTRACT

The invention comprises an apparatus to repair a fuel assembly to accomplish a load lift comprising a main body, an upper section, a connection configured between the main body and the upper section and a lower section connected to the main body. The invention also comprises an inner adjusting body with a top and a bottom wherein a mandrel is connected to the bottom, the mandrel configured to actuate a holding body upon actuation of the inner adjusting body, the inner adjusting body positioned inside the upper section, the main body and the lower section and an actuator connected to the upper section, the actuator configured to actuate the inner adjusting body.

3 Claims, 3 Drawing Sheets

FUEL ASSEMBLY STRUCTURAL REINFORCEMENT AND METHOD

This non-provisional application is based upon a provisional application filed on Jun. 29, 2001 for which priority is claimed.

FIELD OF THE INVENTION

The present invention relates to handling of,nuclear fuel assemblies. More specifically, the present invention provides a structural reinforcement for a nuclear fuel assembly and method for installation and use of such a reinforcement.

BACKGROUND INFORMATION

Handling of heavy objects is a necessary critical activity performed for safe and continuous operation of nuclear power plants. Lifting of nuclear fuel assemblies is often strictly regulated with necessary precautions being undertaken prior to actual load lift. Typical precautions include, for example, ascertaining the weight of the assembly to be lifted, determination of a path that the assembly take during the lift, identification of critical and/or safety sensitive nuclear related components which may be jeopardized during the lift, and evaluation of potential damage in the event of a load drop.

The fuel assemblies provided to a nuclear reactor are composed of a plurality of rods which are supported by a lower nozzle or end fitting. A top nozzle or end fitting is located above the plurality of rods. Interspersed in the plurality of fuel rods are guide thimbles which allow insertion of rod absorber material into and out of the plurality of fuel rods to help control the nuclear reaction. The guide thimbles project between the upper and lower nozzles or end fittings. Between the upper and lower nozzles or end fittings a plurality of spacer grids are positioned at intervals to provide lateral support and prevent destructive side to side movement of individual fuel rods. The top nozzle or end fitting is positioned at the top of the fuel assembly and connects to the guide thimbles via sleeves to allow the load of the entire fuel assembly to be carried from the lower nozzle, up the guide thimbles to the upper end fitting. An instrument tube is located in the interior of the fuel assembly wherein the tube allows instrumentation to be inserted into the assembly during operation or maintenance activities. The fuel assembly top nozzle and bottom nozzle are configured to aid in channeling coolant flow through the assembly during operation. In this configuration, the weight of the fuel rods is born by the guide thimbles and not by the fuel rods when a fuel assembly is lifted by the upper end fitting.

Certain areas in a nuclear power plant or similar facility, are more safety sensitive and require extremely thorough procedures to ensure continued health and safety of the public at large. Such safety sensitive areas include the nuclear reactor itself and the fuel pool. The presence of potentially large amounts of radioactive material in these areas, as well as vital cooling systems for the plant, requires the utmost care when performing lifting in these areas. The required safety in these areas necessitates several additional checks before initiating such evolutions. These checks usually involve, for example, inspecting the structural components of the polar crane or a fuel handling crane. In addition to inspecting of the crane, the actual load lifted (i.e. the fuel assembly itself which will be carried by the crane is inspected and evaluated.

Nuclear plant operating experience has identified that guide thimbles of fuel assemblies, in some cases, exhibit stress corrosion cracking or other structural defects. Specific experience has shown that stress corrosion cracking of the upper guide thimble sleeves, which attach the upper end fitting to-the guide thimbles, can be a significant problem. Numerous documented instances of degradation have been ascertained in the upper end fitting to guide thimble connection, resulting in a potentially dropped fuel assembly accident if a defective fuel assembly is lifted. Current practices in the industry require costly and time consuming alterations to damaged fuel assemblies to allow lifting to occur.

The design of the connection between the upper end fitting and the remainder of the fuel assembly only provides a single load path where the weight of the fuel assembly is supported (i.e. using the guide thimble sleeves). A failure of this single load path, therefore, will result in the fuel assembly being dropped.

There is a need, therefore, to provide a repair to fuel assemblies which exhibit stress corrosion cracking problems or other similar load path defects without incurring costly and time consuming alterations.

There is a further need to provide a redundant load path for a fuel assembly which will be lifted during maintenance activities.

SUMMARY

It is an object of the present invention to provide a fuel assembly structural reinforcement to prevent accidental fuel assembly drop when the fuel assembly exhibits stress corrosion cracking or has another defect in the structural load path.

It is also an object of the present invention to provide a method to repair a damaged fuel assembly to allow the fuel assembly to be safely lifted.

It is also an object of the present invention to provide a redundant load path for a nuclear fuel assembly.

The invention comprises an apparatus to repair a fuel assembly to accomplish a load lift comprising a main body, an upper section, a connection configured between the main body and the upper section and a flower section connected to the main body wherein the lower section is configured to form a holding body. The invention also comprises an inner adjusting body with a top and a bottom wherein a mandrel is connected to the bottom, the mandrel configured to actuate the holding body upon actuation of the inner adjusting body, the inner adjusting body positioned inside the upper section, the main body and the lower section and an actuator connected to the upper section, the actuator configured to actuate the inner adjusting body.

The invention also provides a method for providing a fuel assembly structural reinforcement. The method comprises repairing a fuel assembly to accomplish a load lift including machining a hole through a grillage of a top nozzle of the fuel assembly to access an instrument tube, inserting a reinforcement into the hole to a bottom nozzle of the fuel assembly, and actuating the reinforcement to provide a secondary load path.

DETAILED DESCRIPTION

Figure 1:
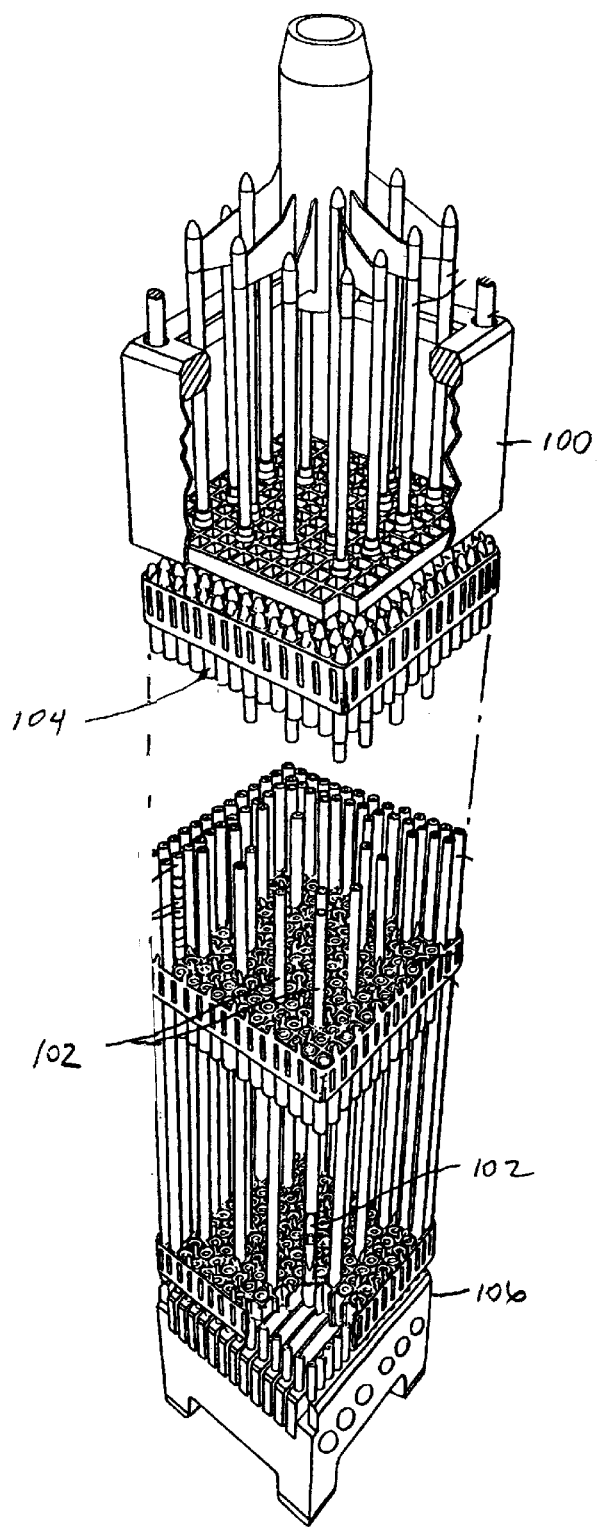
FIG. 1 is illustrative configuration of a sample fuel assembly.

Referring to FIG. 1, a sample fuel assembly is illustrated. The example fuel assembly has a top nozzle 100, a bottom nozzle 106, a plurality of fuel rods 102 between the top and bottom nozzles 100, 106 and guide tube sleeves 104 interspersed between the plurality of fuel rods. During lifting of the fuel assembly, load is carried by the guide tube sleeve 104 to prevent stress from damaging the fuel rods. Industry experience has shown, however, that the guide tube sleeves 104 are susceptible to defects from, for example stress corrosion cracking, therefore affecting the only load path for a lifted assembly. As a result, a damaged fuel assembly is not lifted, hampering maintenance activities. Alternatively, an elaborate handling apparatus, such as a strongback, is used to lift the assembly.

Figure 2:
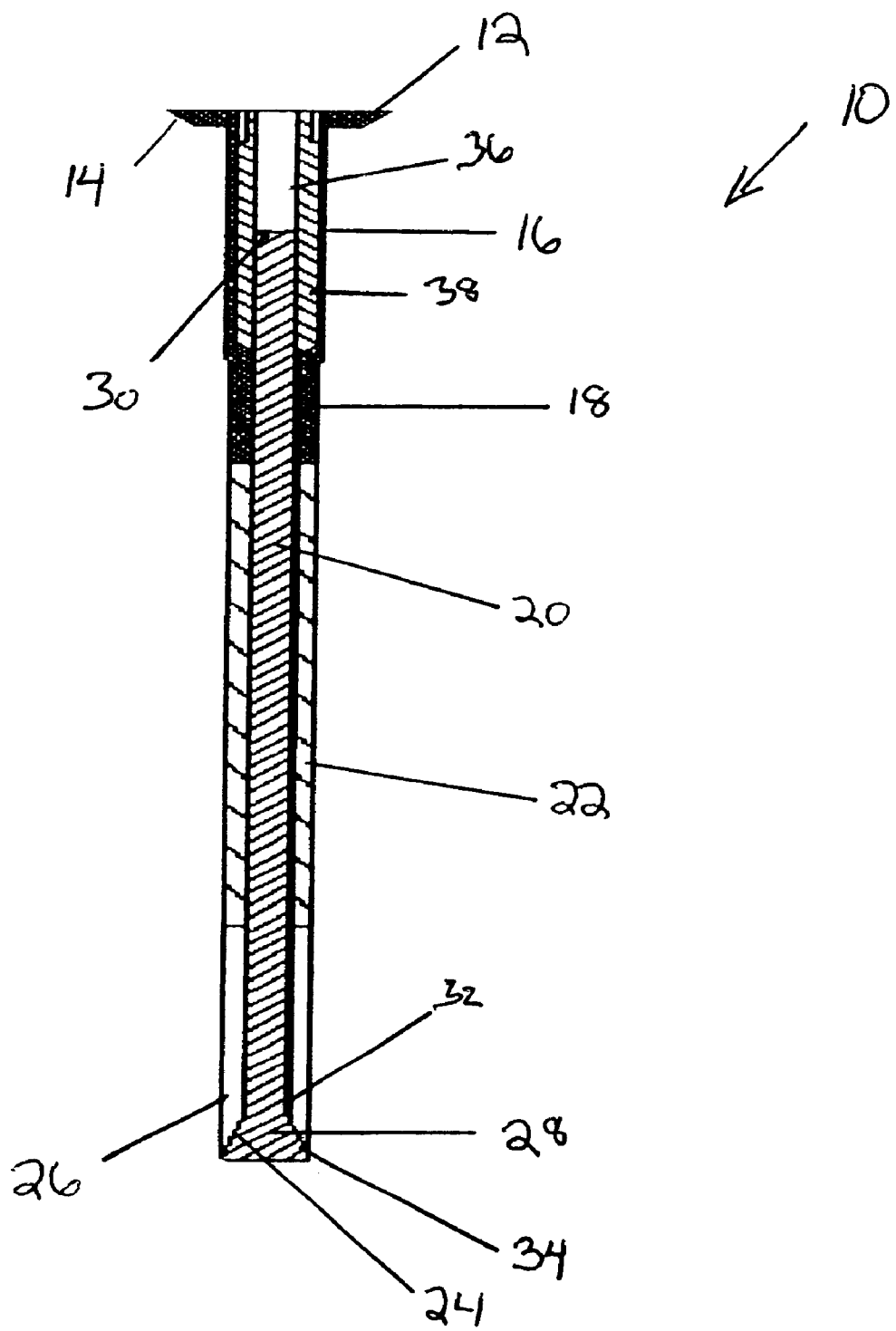
FIG. 2 is a cross-section of a fuel assembly structural reinforcement in conformance with the present invention.

Referring to FIG. 2, a cross-section of a fuel assembly structural reinforcement 10 is illustrated. The fuel assembly structural reinforcement 10 is composed of an actuator 12 which is connected to a sleeve 16. The actuator 12 may be shaped as illustrated with a flat upper surface and a beveled edge 14 to allow a flush fit or a near flush fit during installation of the fuel assembly structural reinforcement 10. The actuator 12 may also be configured in another geometric shape such as a block for example. The actuator 12 and the sleeve 16 may be configured as one piece or may be separate pieces as shown. The reinforcement 10 may also be constructed from carbon steel or corrosive resistant materials. The actuator 12, the sleeve 16 and reinforcement 10 may also be made from a variety of materials such as, for example, stainless steel to provide sufficient structural load carrying capacity during anticipated use. Such anticipated uses include not only dead weight of the lifted fuel assembly, but also any attachments to the fuel assembly, forces from hydraulic drag during movement, seismic loading and impact loadings, among other loadings. The materials chosen for use may also be selected to allow for superior corrosion resistance and to limit foreign materials, such as rust or corrosion products, from entering the moderating fluid of a fuel pool during installation. The sleeve 16 defines It an interior volume 36. In the interior volume 36, an upper section 38 is positioned such that the upper section 38 is snugly arranged in the sleeve 16. The installation of the sleeve 16 in the upper section 38 may be by several methods including press fitting. The installation of the sleeve .16 may also be accomplished through welding to provide a sufficient structural attachment The upper section 38 is provided such that an inner adjusting body 20 is positioned partially internally to the upper section 38. The inner adjusting body 20 extends from the upper section 38 through the connection 18 through to the main body 22 and into the lower section 26. The inner adjusting body 20 may be configured as a rod or other shape and have a top 30 and a bottom 32. The inner adjusting body 20 ray be configured with a connection, such as a threaded screw type connection, to allow the inner adjusting body 20 to move upon force exerted on the actuator 12. In the exemplary embodiment illustrated, rotation of the actuator 12 may be used to cause a rotation of the inner adjusting body 20, consequently moving the body 20 up the main body 22 and the lower section 26. The screw thread arrangement between the adjusting body 20 and the main body 22 and/or actuator 12 and the adjusting body 20 may be configured with any desired number of threads per unit length measurement thereby allowing fine or coarse adjustment. The number and configuration of the screw threads are chosen to provide an adequate holding capacity for the reinforcement 10. The reinforcement 10 may be designed to nuclear single failure proof criteria, such as, for example, with a factor of safety of 10 to 1. The inner adjusting body 20 may also be configured to move in an opposite direction thereby loosening the reinforcement 10. Other configurations are possible and the example embodiment shown is merely illustrative in nature.

The upper end fitting and the reinforcement 10 may be designed such that the fitting is captured in the interior volume 36. The fitting may be captured by several arrangements such as a screw connection. The connection established between the reinforcement 10 and the upper end fitting may be designed as a single failure proof connection to allow a single reinforcement 10 to carry the load of the entire fuel assembly. Alternatively, the reinforcement 10 may be designed for a lesser load such that multiple installed reinforcement 10 units share the load of the assembly. Optional markings may be provided on the actuator 12 to allow visual identification of the capacity of the reinforcement 10. The interior volume 36 may be designed such that with the rod 20 and the mandrel 28 in the fully retracted position, a sufficient volume 36 exists for attachment of an upper end fitting or lifting device to be used.

The overall length of the fuel assembly structural reinforcement 10 may be such that it is configured to provide a repair for differing length fuel assemblies including allowances for changes in length of the fuel assembly from such factors as radiation exposure and temperature. The reinforcement 10, thus, may be adapted in length and overall shape to fit a variety of fuel assemblies such as pressurized water and boiling water reactor types from various manufacturers.

At the bottom 32 of the inner adjusting body 20, a mandrel 28 is attached to actuate a holding body 34 for the inner adjusting body 20. The mandrel 28 may be shaped in a variety of configurations, such as a wedge or a ball, and as such the example embodiment shown is purely illustrative. The mandrel 28 may be attached to the inner adjusting body 20 by forming the mandrel 28 at the same time as the inner adjusting body 20 or alternatively the mandrel 28 may be welded, brazed or positively connected by another arrangement.

The holding body 34 may be configured such that a sufficient amount of material may be positioned to allow the fuel assembly structural reinforcement 10 to have a sufficient sheer capacity for anticipated loadings during lifting of an attached fuel assembly. To provide this necessary sheer capacity, the holding body 34 may be configured with a receiving edge 24 with a steep angle, permitting extension of the lower section 26 upon actuation of the inner adjusting body 20. As will be apparent to those skilled in the art, the lower section 26 may be configured with slots such that movement of the mandrel 28 towards the actuator 12 will allow the lower section 26 to expand in a consistent manner.

Figure 3:
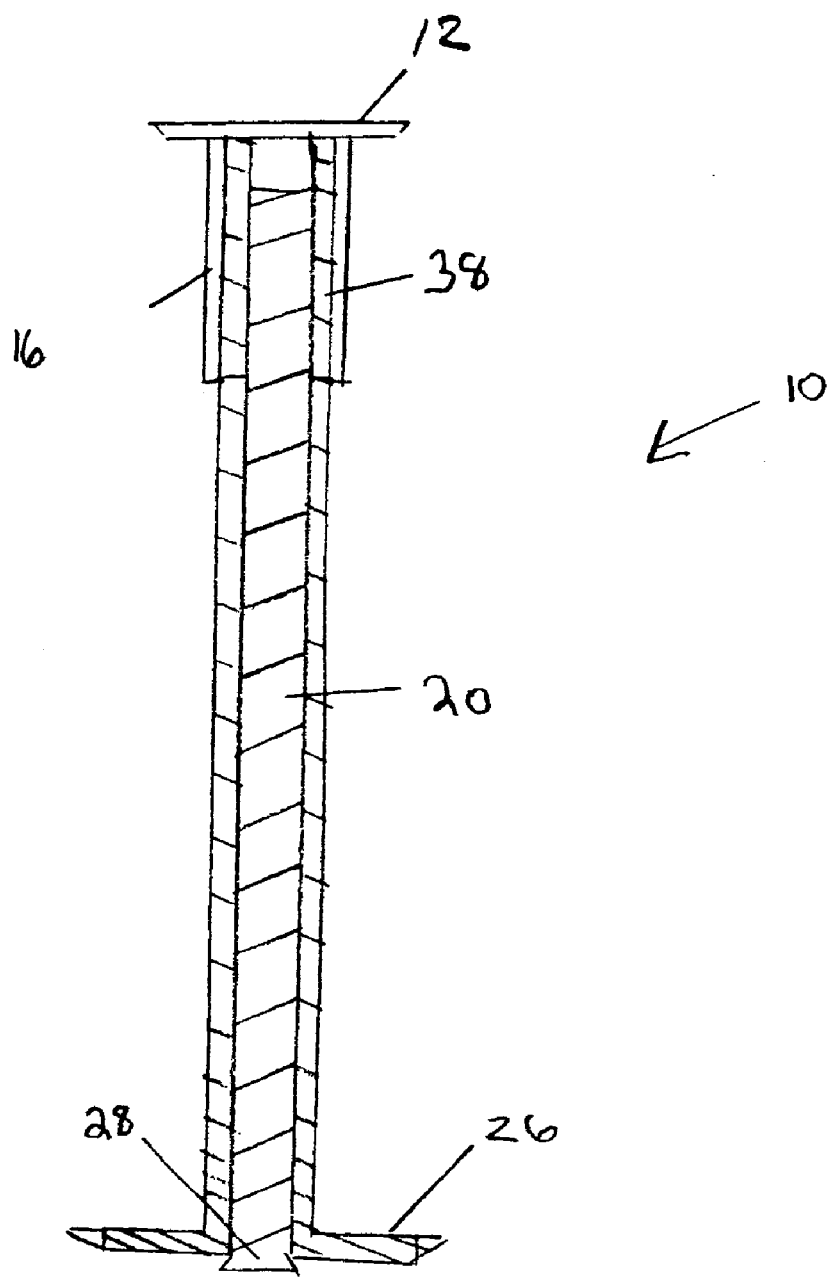
FIG. 3 is a cross-section of a fuel assembly structural reinforcement with retracted mandrel.

Referring to FIG. 3, a fuel assembly structural reinforcement 10 is shown in a mandrel 28 retracted position. Actuation of the actuator 12 allows the mandrel 28 to be drawn to the actuator end of the reinforcement 10. Retraction of the mandrel 28 places a force upon the lower section 26 causing the lower section 26 to extend in an outward direction as measured from the central axis of the reinforcement 10. The extension of the lower section 26 may then be used as a contacting surface to allow load to be transmitted from the bottom nozzle (for example) along the reinforcement 10 thereby creating a secondary load path. The overall shape of the reinforcement 10 may be a tube or other geometry which will allow for ease of installation into the instrument tube. In a typical installation the external diameter of the reinforcement 10 may be 0.405 inches and the internal diameter 0.215 inches. Other configurations are possible wherein the reinforcement may have an external diameter between 0.1 inches to 1 inch and an internal diameter between 0.05 inches to 0.95 inches.

Operationally, the fuel assembly structural reinforcement 10 is used to provide a secondary load path for a fuel assembly. A fuel assembly which has been identified as potentially exhibiting stress corrosion cracking in a guide tube or some other load path feature may be reconfigured to provide a secondary load path using the fuel assembly structural reinforcement 10. A hole is machined through the grillage of the top nozzle of a fuel assembly to provide access to the instrument tube. The fuel assembly structural reinforcement 10 is inserted into the hole that has been created such that the reinforcement 10 may extend from the top nozzle 100 to the bottom nozzle 106. As the actuator 12 at the top of the reinforcement 10 is rotated, for example, the screw and thread arrangement allows the inner adjusting body 20 to be "pulled up" into the main body 22 and the actuator 12 is placed in contact with the top nozzle. The shape of the mandrel 28 located at the bottom 32 of the inner adjusting body 20 causes the receiving edge 24 to contact the exterior of the holding body 34. Further tightening of the actuator 12 causes the lower section 26 to extend outwardly to provide, for example, a locking finger arrangement thereby contacting the structure of the fuel assembly and providing a secondary load path for the fuel assembly when it contacts the structural support such as a lower nozzle as well as finding the actuator 12 to the top nozzle. As will be apparent to those skilled in the art, further rotating of the inner adjusting body 20 will allow further deflection of the lower section 26, providing a larger potential contact surface. It will also be apparent to those skilled in the art that several reinforcements 10 may be used in order to provide needed structural support if a single reinforcement 10 would not provide the necessary load carrying capability. The present invention allows the reinforcement 10 to be inserted into the fuel assembly and then placed in a retracted state to prevent removal of the reinforcement 10 back through the insertion area.

The present invention provides several advantages over conventional methods and apparatus for repairing fuel assemblies. Simple machinery is used to prepare a potentially damaged fuel assembly for installation of the reinforcement 10 such as, for example, a conventional drill. Moreover, the simple configuration of the present invention allows the reinforcement 10 to be installed underwater, protecting operators or machinists from unnecessary radiation exposure. The reinforcement 10 may be installed through use of a robot, crane or other mechanical device such that workers may install the reinforcement from a remote location, i.e. a location away from the reinforcement thereby potentially limiting radiation exposure to workers. Reduced installation time for the reinforcement 10 provides production of a speedy secondary load path saving economic expense for the installer and plant refueling time for the owner. The reinforcement 10 may also be left in place allowing a permanent fix for future moves unlike a special lifting device which must be installed and removed at every move. The installation of the reinforcement 10 does not add significant weight to the assembly eliminating costly analysis for movement of a fuel assembly over safety significant structures or components. Additionally, the reinforcement 10 may be readily installed by, craftpersons eliminating potential human error inherent in costly and complicated devices.

All materials used for the reinforcement may be constructed of materials in conformance with high quality requirements of the nuclear industry. All connections, such as for example, welds may be inspected with any type of inspection technique such as magnetic particle inspection or liquid penetrate inspection for example, to determine the presence of defects in the materials used. Both the connections and the materials used may also allow for varying operational temperature considerations which may be present during lifting such as directly after reactor shutdown or after prolonged cooling of an assembly. The materials chosen also may be selected to prevent or limit galvanic reaction with fuel assembly materials.

In the foregoing specification, the invention has been described with reference to specific exemplary embodiments, thereof. It will, however, be evident that various modifications and changes may be made thereunto without departing from the broader spirit and scope of the invention as set forth in the appended claims. The specification and drawings are accordingly to be regarded in an illustrative rather than a restrictive sense.

What is claimed is:

1. A method of repairing a fuel assembly to accomplish a load lift comprising:
    machining a hole through a grillage of a top nozzle of the fuel assembly to access an instrument tube;
    inserting a fuel assembly structural reinforcement into the hole to a bottom nozzle of the fuel assembly; and
    actuating the reinforcement to provide a secondary load path, wherein the actuating is by rotating the actuator at the top of the reinforcement.

2. The method of repairing a fuel assembly of claim 1, wherein the machining, the inserting and the actuating are performed remotely.

3. The method of repairing a fuel assembly of claim 1, wherein the actuating prevents the reinforcement from being removed from the hole.

* * * * *

UNITED STATES PATENT AND TRADEMARK OFFICE
CERTIFICATE OF CORRECTION

PATENT NO. : 6,636,578 B1  Page 1 of 1
DATED : October 21, 2003
INVENTOR(S) : Darel Ray Clark It is certified that error appears in the above-identified patent and that said Letters Patent is hereby corrected as shown below:

Column 1,
Line 9, please change "of, nuclear fuel" to -- of nuclear fuel --;

Column 2,
Line 4, please change "to-the guide" to -- to the guide --;
Line 42, please change "a flower section" to -- a lower section --;
Line 62, please change "is illustrative configuration" to -- is an illustrative --;

Column 3,
Line 7, please change "guide tube sleeve" to -- guide tube sleeves --;
Line 40, please change "it an interior" to -- defines an interior --;
Line 44, please change "the sleeve. 16" to -- the sleeve 16 --;
Line 46, please change "attachment The upper" to -- attachment. The upper --;

Column 6,
Line 12, please change "by, craftpersons" to -- by craftpersons --.

Signed and Sealed this

Thirteenth Day of April, 2004

JON W. DUDAS
*Acting Director of the United States Patent and Trademark Office*